(12) United States Patent
Beistle et al.

(10) Patent No.: US 10,507,542 B2
(45) Date of Patent: Dec. 17, 2019

(54) SYSTEM AND METHOD FOR PAIRING WELDING DEVICES

(71) Applicant: Illinois Tool Works Inc., Glenview, IL (US)

(72) Inventors: Edward G. Beistle, Appleton, WI (US); Andrew D. Nelson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 839 days.

(21) Appl. No.: 13/857,509

(22) Filed: Apr. 5, 2013

(65) Prior Publication Data

US 2013/0319988 A1    Dec. 5, 2013

Related U.S. Application Data

(60) Provisional application No. 61/653,887, filed on May 31, 2012.

(51) Int. Cl.
| | | |
|---|---|---|
| *B23K 9/10* | (2006.01) | |
| *B23K 9/24* | (2006.01) | |
| *B23K 9/173* | (2006.01) | |
| *B23K 9/32* | (2006.01) | |

(52) U.S. Cl.
CPC .............. *B23K 9/24* (2013.01); *B23K 9/1043* (2013.01); *B23K 9/173* (2013.01); *B23K 9/32* (2013.01)

(58) Field of Classification Search
CPC .................................. B23K 9/10; B23K 9/1087
USPC ................... 219/137 R, 136, 137.71, 132
See application file for complete search history.

(56) References Cited

U.S. PATENT DOCUMENTS

| | | | |
|---|---|---|---|
| 4,266,114 A | | 5/1981 | Hansen |
| 5,276,305 A | | 1/1994 | Hsien |
| 6,040,555 A | * | 3/2000 | Tiller ................... B23K 9/1087 219/132 |

(Continued)

FOREIGN PATENT DOCUMENTS

| | | |
|---|---|---|
| CA | 2593106 | 12/2007 |
| CN | 2351233 | 12/1999 |

(Continued)

OTHER PUBLICATIONS

International Search Report from PCT application No. PCT/US2013/043486 dated Oct. 8, 2013, 11 pgs.

(Continued)

*Primary Examiner* — Dana Ross
*Assistant Examiner* — Lawrence H Samuels
(74) *Attorney, Agent, or Firm* — McAndrews, Held & Malloy, Ltd.

(57) ABSTRACT

Systems and methods for pairing welding devices in a welding system. In one method, the method includes sending a pairing request from a first welding device to a second welding device. The method also includes receiving, at the first welding device, a response to the pairing request from the second welding device. The second welding device is physically connected to the first welding device. The pairing request or the response includes a change in welding power, welding consumables, or any combination thereof. The method includes pairing the first welding device and the second welding device after the first welding device receives the response to the pairing request from the second welding device.

20 Claims, 6 Drawing Sheets

(56) References Cited

U.S. PATENT DOCUMENTS

| | | | |
|---|---|---|---|
| 6,291,798 B1* | 9/2001 | Stava | B23K 9/1006 219/130.32 |
| 6,423,936 B1 | 7/2002 | Reed | |
| 6,570,132 B1 | 5/2003 | Brunner et al. | |
| 6,697,701 B2* | 2/2004 | Hillen | G05B 19/042 219/110 |
| 6,815,640 B1* | 11/2004 | Spear | B23K 9/095 219/130.5 |
| 6,816,067 B2 | 11/2004 | Patton | |
| 6,906,285 B2* | 6/2005 | Zucker | B23K 9/124 219/132 |
| 6,909,285 B2 | 6/2005 | Jordan et al. | |
| 7,041,936 B2* | 5/2006 | Oberzaucher | B23K 9/0953 219/130.21 |
| 7,049,547 B1* | 5/2006 | Brunner | B23K 9/1062 219/130.5 |
| 7,205,503 B2* | 4/2007 | Reynolds | B23K 9/1087 219/132 |
| 7,294,808 B2* | 11/2007 | Furman | B23K 9/095 219/132 |
| 7,907,901 B1 | 3/2011 | Kahn | |
| 8,592,724 B2* | 11/2013 | Ott | B23K 9/1087 219/132 |
| 2002/0168937 A1* | 11/2002 | Clark | B23K 9/1062 455/41.1 |
| 2003/0089696 A1 | 5/2003 | Yokoyama | |
| 2004/0026391 A1* | 2/2004 | Oberzaucher | B23K 9/0953 219/130.1 |
| 2005/0016975 A1* | 1/2005 | Reynolds | B23K 9/1087 219/132 |
| 2005/0199605 A1* | 9/2005 | Furman | B23K 9/095 219/132 |
| 2005/0230372 A1* | 10/2005 | Ott | B23K 9/124 219/132 |
| 2005/0258154 A1* | 11/2005 | Blankenship | B23K 9/0953 219/130.01 |
| 2006/0027546 A1* | 2/2006 | Reynolds | B23K 9/1087 219/132 |
| 2006/0138113 A1* | 6/2006 | Ott | B23K 9/1087 219/132 |
| 2006/0237409 A1* | 10/2006 | Uecker | B23K 9/1068 219/130.5 |
| 2007/0080149 A1* | 4/2007 | Albrecht | B23K 9/10 219/130.01 |
| 2007/0080153 A1* | 4/2007 | Albrecht | B23K 9/10 219/130.01 |
| 2007/0080154 A1* | 4/2007 | Ott | B23K 9/095 219/132 |
| 2007/0114216 A1* | 5/2007 | Ott | B23K 9/124 219/132 |
| 2008/0011728 A1* | 1/2008 | Peters | B23K 9/1062 219/130.5 |
| 2008/0057868 A1 | 3/2008 | Chang | |
| 2009/0302015 A1* | 12/2009 | Feitzlmaier | B23K 9/0953 219/132 |
| 2009/0319673 A1* | 12/2009 | Peters | H04W 4/08 709/228 |
| 2011/0049116 A1* | 3/2011 | Rappl | B23K 9/1006 219/132 |
| 2011/0073569 A1* | 3/2011 | Rappl | B23K 9/095 219/73.2 |
| 2011/0180517 A1* | 7/2011 | Schneider | B23K 9/1006 219/108 |
| 2011/0306882 A1* | 12/2011 | Hannon | A61B 6/548 600/443 |
| 2013/0200055 A1* | 8/2013 | Enyedy | B23K 9/124 219/130.21 |
| 2015/0196970 A1* | 7/2015 | Denis | B23K 9/10 219/130.1 |

FOREIGN PATENT DOCUMENTS

| | | |
|---|---|---|
| CN | 1256654 | 6/2000 |
| CN | 1665634 | 9/2005 |
| CN | 101327544 | 12/2008 |
| DE | 69320550 | 3/1999 |
| EP | 2323307 | 5/2011 |

OTHER PUBLICATIONS

Communication of Notice of Opposition for EP application No. 13730089.3 dated Feb. 13, 2017, 15 pgs.

Communication of Notice of Opposition for EP application No. 13730089.3, dated Feb. 9, 2017, 43 pgs.

* cited by examiner

SYSTEM AND METHOD FOR PAIRING WELDING DEVICES

CROSS REFERENCE TO RELATED APPLICATIONS

This application is a Non-provisional U.S. Patent Application of U.S. Provisional Application No. 61/653,887, entitled "System and Method for Pairing Welding Devices", filed May 31, 2012, which is hereby incorporated by reference in its entirety.

BACKGROUND

The invention relates generally to welding systems and, more particularly, to systems and methods for pairing welding devices in a welding system.

Welding is a process that has increasingly become utilized in various industries and applications. Such processes may be automated in certain contexts, although a large number of applications continue to exist for manual welding operations. In both cases, such welding operations rely on communication between a variety of types of equipment (e.g., devices) to ensure that welding operations are performed properly.

Certain welding systems may include devices that communicate with each other using wired communication, while other welding systems may include devices that communicate with each other using wireless communication. Devices within the welding systems may be paired together so that the devices know what to communicate with within the welding system. For example, a first welding system may include a first welding power supply paired with a first wire feeder. As another example, a second welding system may include a second welding power supply paired with a first remote control device. As will be appreciated, wired and/or wireless communication may be susceptible to cross-talk or other interference. Accordingly, devices that attempt to pair together automatically (e.g., without user interaction) may become incorrectly paired.

A wide range of technologies have been developed for ensuring proper pairing of devices, particularly in the wireless area. Many of the protocols utilized there, however, are inappropriate to welding applications, particularly insomuch as they are not sufficiently robust, may result in wrong pairing, and do not address the crosstalk issues that may exist, particularly where welding conductors are positioned near one another and to various degrees may become inductively coupled, thereby exacerbating the potential for crosstalk.

BRIEF DESCRIPTION

The present invention is intended to address such concerns, particularly in the area of welding systems with their unique problems and challenges. The proposed pairing techniques make use of commanded or responsive changes in welding parameters to ensure that the pairing "handshake" is proper, that is, between the proper devices. This may both simplify the pairing process, and ensure proper pairing, both resulting from the use of welding application-specific parameter changes.

In one embodiment, a method for pairing welding devices includes sending a pairing request from a first welding device to a second welding device. The method also includes receiving, at the first welding device, a response to the pairing request from the second welding device. The second welding device is physically connected to the first welding device. The pairing request or the response includes a change in welding power, welding consumables, or any combination thereof. The method includes pairing the first welding device and the second welding device after the first welding device receives the response to the pairing request from the second welding device.

In another embodiment, a welding system includes a first welding device and a second welding device configured to provide welding power, welding consumables, or any combination thereof to the first welding device. The first welding device is configured to send a pairing request to the second welding device, receive a response to the pairing request from the second welding device, and pair with the second welding device after receiving the response to the pairing request. The pairing request or the response includes a change in welding power, welding consumables, or any combination thereof.

In another embodiment, a method for pairing welding devices includes receiving a pairing request from a first welding device at a second welding device. The method also includes sending, from the second welding device, a response to the pairing request. The second welding device is physically connected to the first welding device. The pairing request or the response includes a change in welding power, welding consumables, or any combination thereof. The method also includes pairing the first welding device and the second welding device after the second welding device sends the response to the pairing request.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In certain embodiments, welding devices may be paired together automatically (e.g., without user intervention). The welding devices may be paired together using wireless and/or wired communication over a variety of communication channels (e.g., power line communication, RS-232, RS-485, Ethernet, Wi-Fi, Zigbee, Bluetooth, cellular) in conjunction with a change in a signal provided via a physical connection (e.g., welding power connection, shielding gas connection, welding wire connection, pneumatic connection, hydraulic connection, fiber optics connection) between the welding devices to verify that the welding devices are physically connected together. By verifying that the welding devices are physically connected together, welding devices may be accurately paired together without user intervention regardless of whether cross-talk may exist during pairing.

As used herein, the term "pairing" means associating devices so the devices can communicate together and so the devices can identify one or more devices that are being communicated with. The associating of the devices may include the devices sharing a unique identifier with one another, and the devices storing the unique identifiers of associated devices. Accordingly, as used herein, the terms "paring" and "associating" are considered synonymous. Furthermore, the terms "pair" and "associate" are synonymous, and the terms "paired" and "associated" are synonymous. Moreover, pairing is not limited to two devices, but encompasses an association between any number of devices.

Figure 1:
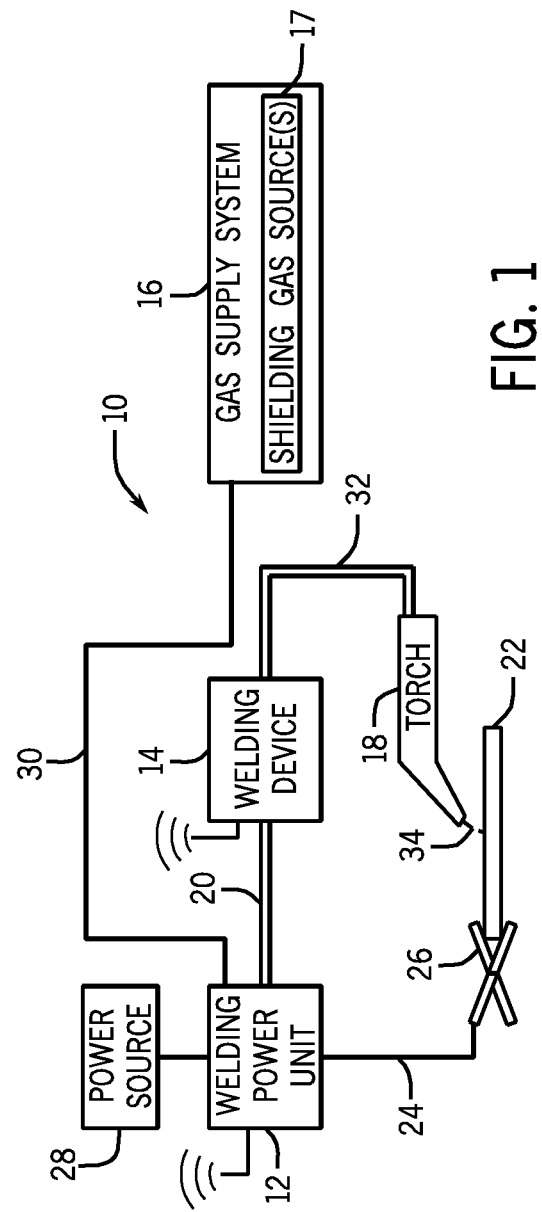
FIG. 1 is a block diagram of an embodiment of a welding system where a welding power unit and a welding device may be paired together in accordance with aspects of the present disclosure.

Turning to the figures, FIG. 1 illustrates an embodiment of a welding system 10 (e.g., a gas metal arc welding (GMAW) system) where a welding power unit 12 and a welding device 14 may be paired together in accordance with aspects of the present disclosure. It should be appreciated that, while the present discussion may focus specifically on the GMAW system 10 illustrated in FIG. 1, the presently disclosed pairing methods may be used in systems using any arc welding process (e.g., FCAW, FCAW-G, GTAW, SAW, SMAW, or similar arc welding process). Furthermore, although the present application specifically relates to pairing welding devices together, the pairing methods provided herein may be applied to pairing any two devices together.

As illustrated, the welding system 10 includes the welding power unit 12, the welding device 14 (e.g., a welding wire feeder, remote device, pendant, remote control), a gas supply system 16, and a welding torch 18. The welding power unit 12 generally supplies welding power (e.g., voltage, current, etc.) to the welding system 10 and may be coupled to the welding device 14 via a cable bundle 20 as well as coupled to a workpiece 22 using a work cable 24 having a clamp 26.

The cable bundle 20 may include a wired communication channel between the welding power unit 12 and the welding device 14. For example, the welding power unit 12 may communicate with the welding device 14 via power line communication where data is provided (e.g., transmitted, sent, transferred, delivered) over welding power (e.g., over the same physical electrical conductor). As will be appreciated, the welding power unit 12 may communicate with the welding device 14 using any suitable wired or wireless protocol (e.g., RS-232, RS-485, Ethernet, a proprietary communication protocol). In certain embodiments, the welding power unit 12 and the welding device 14 may communicate using a wired communication channel that links the welding power unit 12 and the welding device 14 via a network (e.g., Internet, intranet). For example, both the welding power unit 12 and the welding device 14 may be wired to the Internet using an Ethernet cable. Accordingly, the welding power unit 12 may communicate with the welding device 14 via the Internet. In some embodiments, the welding power unit 12 and the welding device 14 may communicate (e.g., either directly, or indirectly via a network) using a wireless communication channel (e.g., Wi-Fi, Bluetooth, Zigbee, cellular).

As will be appreciated, the welding power unit 12 and the welding device 14 may be paired together automatically (e.g., without user intervention). However, when pairing the welding power unit 12 and the welding device 14 together cross-talk or other interference may be present. Furthermore, the welding power unit 12 and the welding device 14 may need to have a way to verify that the welding power unit 12 is physically coupled to the welding device 14. Accordingly, the welding power unit 12 may control a change in welding power (e.g., change in welding voltage, change in welding current, etc.) and/or welding consumables provided between the welding power unit 12 and the welding device 14 so that the welding device 14 can verify that pairing between the welding power unit 12 and the welding device 14 is occurring. For example, during pairing of the welding power unit 12 and the welding device 14, the welding device 14 may request verification that the welding power unit 12 is physically coupled to the welding device 14. Accordingly, the welding power unit 12 may change welding power (e.g., current, voltage, etc.) output from the welding power unit 12 such that the welding device 14 can verify that the welding power unit 12 is physically connected to the welding device 14. As another example, during pairing of the welding power unit 12 and the welding device 14, the welding power unit 12 may request verification that the welding device 14 is physically coupled to the welding power unit 12. Accordingly, the welding power unit 12 may send a pairing request by changing welding power output from the welding power unit 12 such that the welding device 14 can provide a response indicating that the welding device 14 is physically connected to the welding power unit 12. Furthermore, the welding power unit 12 may change a shielding gas output. In certain systems, a change in welding wire, hydraulic fluid flow, pneumatic air flow, light or laser transmissions, or any other change may be provided between two devices to verify that two devices are physically connected together. As such, the two devices may verify that they are physically coupled together and are being correctly paired together.

The welding power unit 12 may generally include power conversion circuitry that receives input power from an alternating current power source 28 (e.g., an AC power grid, an engine/generator set, or a combination thereof), conditions the input power, and provides DC or AC output power via the cable 20. As such, the welding power unit 12 may power the welding device 14 that, in turn, powers the welding torch 18, in accordance with demands of the welding system 10. The work cable 24 terminating in the clamp 26 couples the welding power unit 12 to the workpiece 22 to close the circuit between the welding power unit 12, the workpiece 22, and the welding torch 18. The welding power unit 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes the gas supply system 16 that supplies a shielding gas or shielding gas mixtures from one or more shielding gas sources 17 to the welding torch 18. In the depicted embodiment, the gas supply system 16 is directly coupled to the welding power unit 12 via a gas conduit 30. The welding power unit 12 may regulate the flow of gas from the gas supply system 16 to the welding torch 18. In another embodiment, the gas supply system 16 may instead be coupled to the welding device 14, and the welding device 14 may regulate the flow of gas from the gas supply system 16 to the welding torch 18.

A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via conduit 30) may include Ar, Ar/$CO_2$ mixtures, Ar/$CO_2$/$O_2$ mixtures, Ar/He mixtures, and so forth.

In the illustrated embodiment, the welding device 14 is coupled to the welding torch 18 via a cable bundle 32 in order to supply consumables (e.g., shielding gas, welding wire) and welding power to the welding torch 18 during operation of the welding system 10. In another embodiment, the cable bundle 32 may only provide welding power to the welding torch 18. During operation, the welding torch 18 may be brought near the workpiece 22 so that an arc 34 may be formed between the consumable welding electrode (i.e., the welding wire exiting a contact tip of the welding torch 18) and the workpiece 22.

Figure 2:
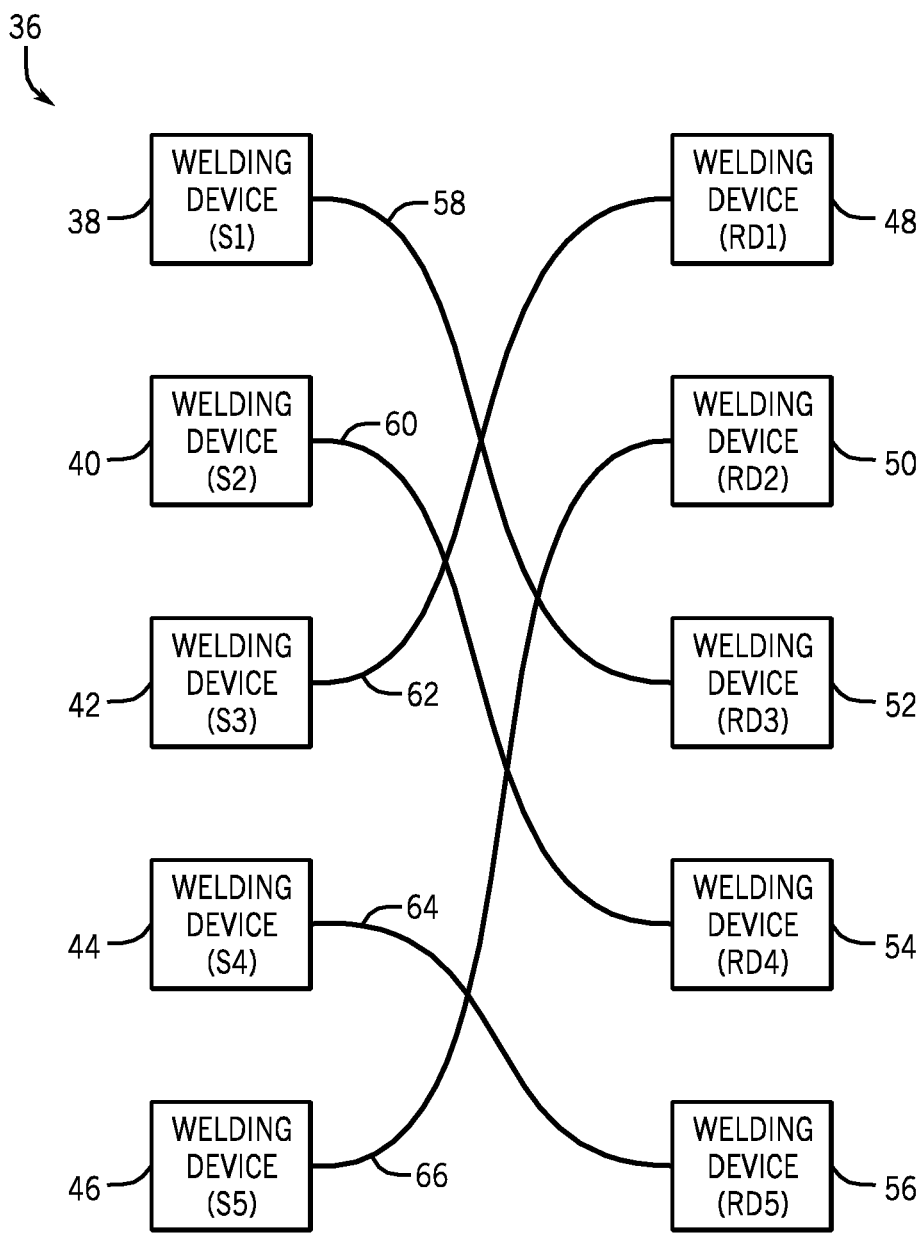
FIG. 2 is a block diagram of an embodiment of multiple welding systems that may be paired together in accordance with aspects of the present disclosure.

FIG. 2 is a block diagram of an embodiment of multiple welding systems 36 that may be paired together in accordance with aspects of the present disclosure. As illustrated, the multiple welding systems 36 may include multiple source devices (e.g., welding power units 12) such as a welding device (S1) 38, a welding device (S2) 40, a welding device (S3) 42, a welding device (S4) 44, and a welding device (S5) 46. A "source device" as used herein generally refers to a device that provides a response to a remote device via a physical connection between the source device and the remote device. The response is a unidirectional output from the source device of something provided by the source device and is not standard communication (e.g., it is not something that is used for continuous communication). For example, the source device may provide a pulse or change in a high power output (e.g., welding power), a gas flow, a fluid flow, a heat provided, a light emitted, a sound, and so forth. The source device may be paired with the remote device to exchange data with the remote device.

Furthermore, the multiple welding systems 36 may include multiple remote devices (e.g., welding devices 14) such as a welding device (RD1) 48, a welding device (RD2) 50, a welding device (RD3) 52, a welding device (RD4) 54, and a welding device (RD5) 56. A "remote device" as used herein generally refers to a device that receives a response from the source device via a physical connection between the remote device and the source device. The response is a unidirectional output from the source device of something provided by the source device and is not standard communication. For example, the remote device may receive a pulse or change in a high power output (e.g., welding power), a gas flow, a fluid flow, a heat provided, a light emitted, a sound, and so forth. The remote device may be paired with the source device to exchange data with the source device.

As illustrated, each of the source devices may be physically coupled to one of the remote devices. For example, S1 38 may be physically coupled to RD3 52 via a physical connection 58. In addition, S2 40 may be physically coupled to RD4 54 via a physical connection 60. Furthermore, S3 42 may be physically coupled to RD1 48 via a physical connection 62. Likewise, S4 44 may be physically coupled to RD5 56 via a physical connection 64. Moreover, S5 46 may be physically coupled to RD2 50 via a physical connection 66. Although the source devices are physically coupled to the remote devices, standard communication between the source devices and the remote devices may not occur using the physical connections. However, the physical connections are needed during the pairing process to verify that a source device is physically coupled to a remote device.

In certain embodiments, the physical connections 58, 60, 62, 64, and 66 may include cables where welding power (e.g., voltage, current, etc.) is provided from the source device to the remote device. Furthermore, data may be provided between the source devices and the remote devices by modulating the data over the welding power (e.g., power line communication). As previously explained, cross-talk may exist between data provided over different physical connections 58, 60, 62, 64, and 66. Accordingly, as source devices and remote devices may attempt to automatically pair together using the data over the welding power, data may be incorrectly provided to an undesired source device and/or remote device. As such, the welding power may be used to verify that a source device is physically coupled to a remote device. For example, a predetermined change (e.g., a pulsed change) in welding power may be used to signify that a particular source device is coupled to a particular remote device, as explained in greater detail in FIGS. 3 and 4.

Figure 3:
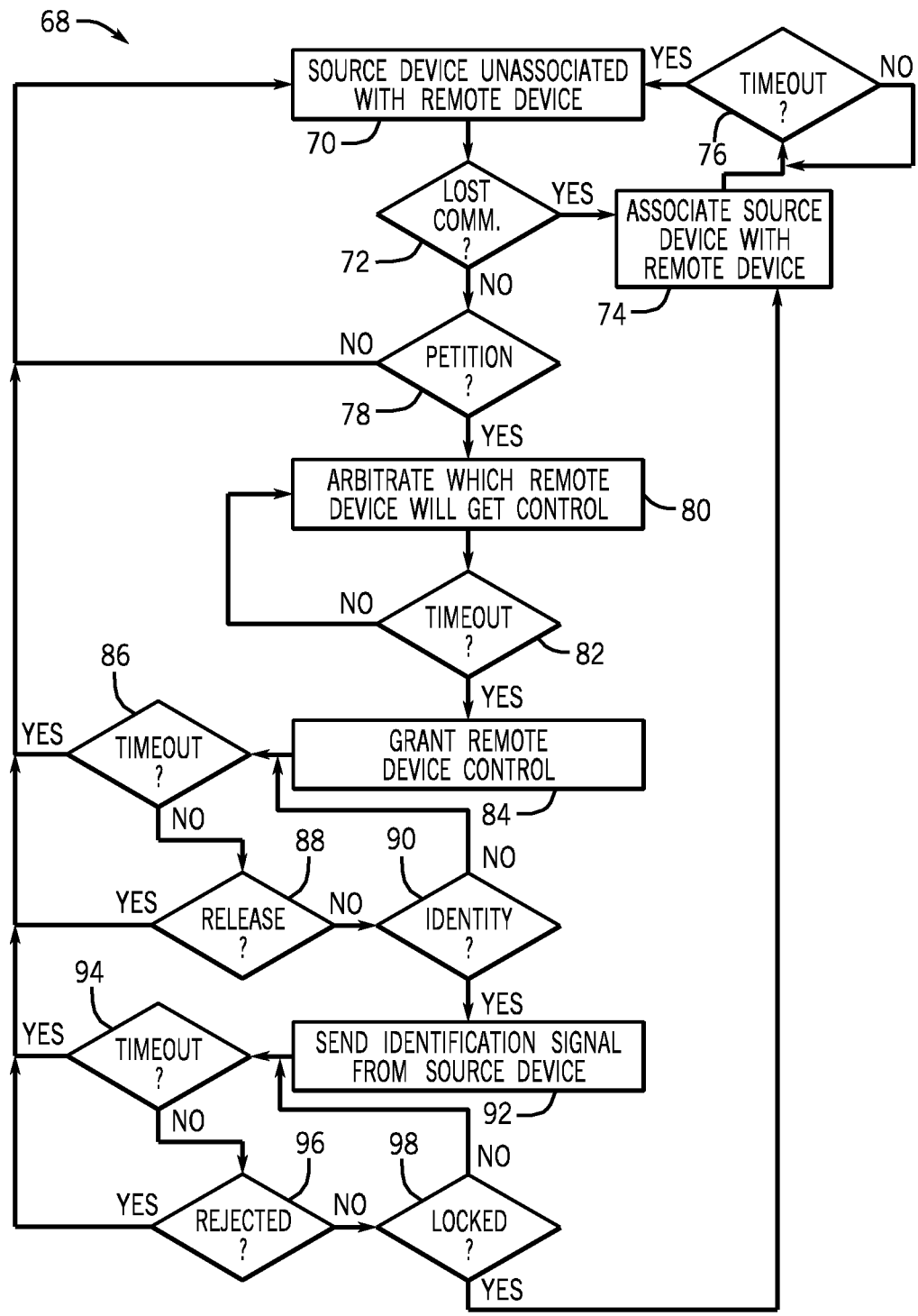
FIG. 3 is a flow chart of an embodiment of a method for pairing source devices with remote devices in accordance with aspects of the present disclosure.

FIG. 3 is a flow chart of an embodiment of a method 68 for pairing source devices with remote devices in accordance with aspects of the present disclosure. At block 70, a source device determines that it is unassociated (e.g., not paired) with a remote device. At block 72, the source device determines whether it is unassociated because of lost communication between the source device and a remote device. If the source device determines that it is unassociated with a remote device because of lost communication, the source device is re-associated (e.g., re-paired) with the remote device, per block 74. In certain embodiments, the source device may have a predetermined time period (e.g., approximately 10 seconds) after lost communication to re-associate with the remote device. In some embodiments, the predetermined time period may be based on a duration after the source device is powered on. The source device determines whether a timeout (e.g., a time period that elapses without communication) occurs between the source device and the remote device (block 76). If a timeout occurs, the source device determines that it is unassociated with the remote device (block 70). However, if a timeout does not occur, the source device remains associated with the remote device and continues to determine whether a timeout occurs (block 76).

Returning to block 72, if the source device determines that it is not unassociated with a remote device because of lost communication, the source device may determine whether a petition for association has been received by a remote device (block 78). A petition for association is sent by a remote device when the remote device seeks to be paired with a source device. If a petition for association has not been received, the source device returns to block 70. However, if a petition for association has been received, the source device arbitrates (e.g., decides) which remote device will get control of the association process and broadcast the identity of the remote device that will get control (e.g., the arbitration device) (block 80). At block 82, the source device determines whether a timeout (e.g., a time period that elapses without a new arbitration device identity being broadcast) occurs after the identity of the arbitration device has been broadcast. If a timeout does not occur (e.g., a new arbitration device identity is broadcast), the source device returns to block 80. However, if a timeout occurs (e.g., there is not a new arbitration device identity broadcast), the arbitration device is granted control by the source device (block 84).

After the arbitration device is granted control, the source device determines whether a timeout occurs (e.g., too much time elapses before an identity request is received) (block 86). If a timeout occurs, the source device returns to block 70. However, if a timeout does not occur, the source device determines whether it has been released by the arbitration device (e.g., the arbitration device has emptied its list and an identity request of the source device was not received) (block 88). If the source device has been released by the arbitration device, the source device returns to block 70. If the source device has not been released by the arbitration device, the source device determines whether an identity request (e.g., a request for the source device to output an identifications signal over the physical connection) has been received (block 90). If an identity request has not been received, the source device returns to block 86.

On the other hand, if an identity request has been received, the source device broadcasts an identification signal (e.g., a change in welding power output, shielding gas flow, welding wire flow, hydraulic flow, pneumatic flow, light transmissions) (block 92). At block 94, the source device determines whether a timeout has occurred since the identification signal was sent. If a timeout has occurred, the source device returns to block 70. However, if a timeout has not occurred, the source device determines whether a reject message is received from a remote device (e.g., rejecting an association with the source device) (block 96). If a reject message is received, the source device returns to block 70. However, if a reject message is not received, the source device determines whether a locking signal has been received (block 98). If a locking signal has not been received, the source device returns to block 94. However, if a locking signal has been received, the source device is associated with the remote device (block 74). Accordingly, the source device is associated (e.g., paired) with the remote device using a response (e.g., identification signal) provided over a physical connection to verify that the devices are physically connected together. The physical connection ensures that any present cross-talk does not interfere with the pairing of the source device and the remote device. Once paired, the source device and the remote device may communicate together knowing that they are the devices that are physically coupled together.

Figure 4:
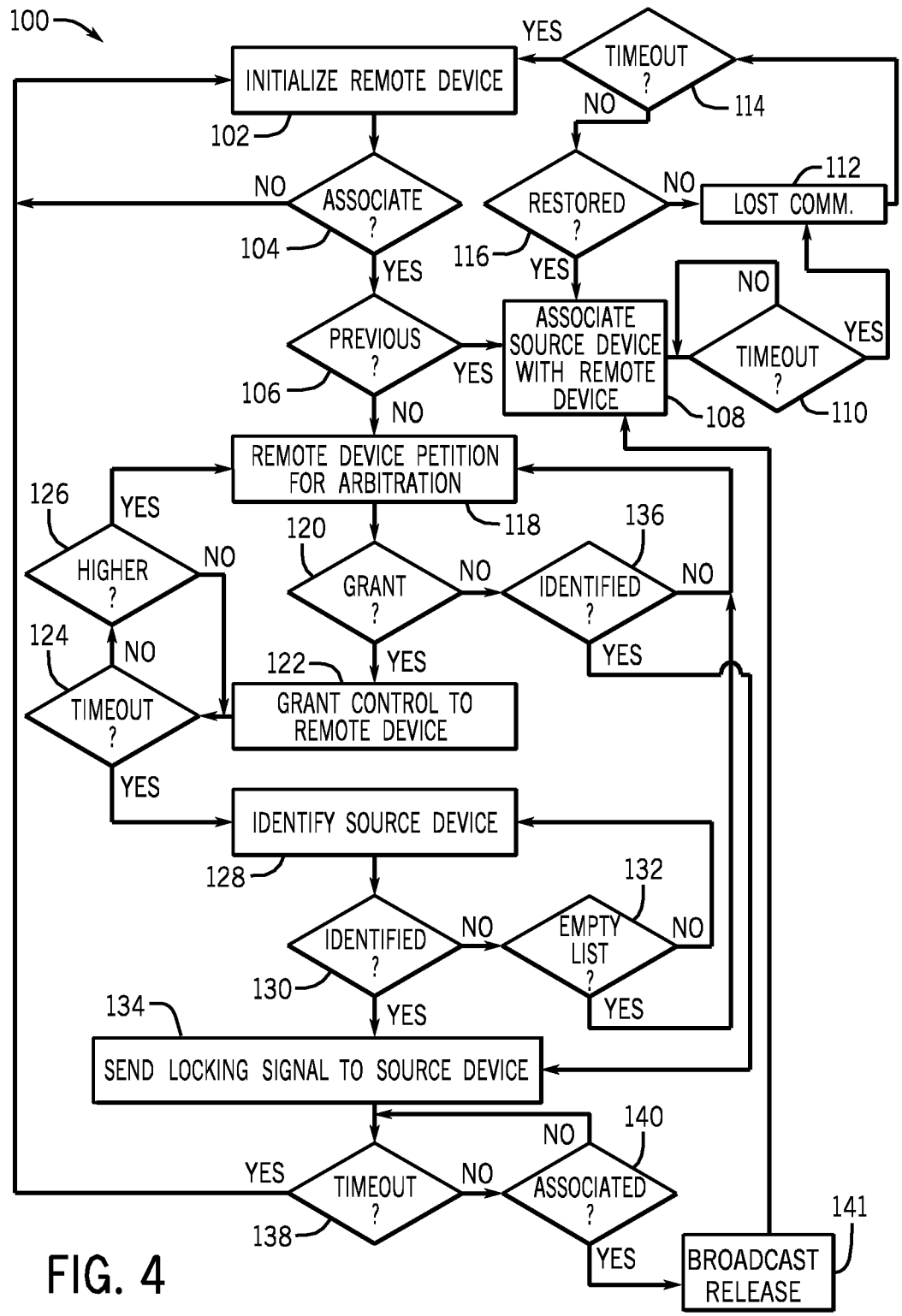
FIG. 4 is a flow chart of an embodiment of a method for pairing remote devices with source devices in accordance with aspects of the present disclosure.

FIG. 4 is a flow chart of an embodiment of a method 100 for pairing remote devices with source devices in accordance with aspects of the present disclosure. At block 102, the remote device is initialized (e.g., powered on, reset). After being initialized, the remote device determines whether it is ready to associate with a source device (block 104). If the remote device determines that it is not ready to associate with a source device, the remote device returns to block 102. However, if the remote device determines that it is ready to associate with a source device, the remote device determines whether it has been previously associated with a source device (block 106).

If the remote device has been previously associated with a source device, the remote device re-associates with the source device (block 108). In certain embodiments, the remote device may re-associate (e.g., recover) a previous association if the previous association existed within a predetermined duration (e.g., such as a duration that begins after the remote device is powered on). After re-associating, the remote device determines whether a timeout (e.g., a time period that elapses without communication) occurs between the remote device and the source device (block 110). If a timeout has not occurred, the remote device returns to block 110. If a timeout occurs, the remote device may have lost communication with the source device (block 112). Per block 114, if a timeout occurs after communication is lost, the remote device returns to block 102. If a timeout does not occur, the remote device determines whether communication has been restored (block 116). If communication between the remote device and the source device has been restored, the remote device returns to block 108. If communication between the remote device and the source device is not restored, the remote device returns to block 112.

Returning to block 106, if the remote device has not been previously associated with a source device, the remote device provides a petition for arbitration (e.g., a request to be paired) to the source devices (block 118). At block 120, the remote device determines whether a grant to be the arbitration device has been received from a source device. The arbitration device is an unassociated device that is used to control the order of identity requests sent to source devices. If a grant to be the arbitration device has been received by the remote device, a source device grants control to the remote device (block 122). The remote device then determines whether a timeout has occurred since it was granted control (block 124). If a timeout has not occurred, the remote device determines whether a grant for a higher ranking (e.g., higher identification number, lower identification number, etc.) remote device has been received (block 126). If the remote device has received a grant for a higher ranking device, the remote device returns to block 118. If however, the remote device has not received a grant for a higher ranking device, the remote device returns to block 124.

At block 124, if a timeout has occurred (e.g., there is not a higher ranking device), the remote device takes control (e.g., gets the floor) and begins to request that source devices identify themselves by cycling through a list of source devices that the remote device has received communication from (block 128). The remote device goes sequentially through each source device in its list and sends a request to the source device for an identity response. At block 130, the remote device determines whether it has received a response from a source device (e.g., a source device has been identified) physically connected to the remote device (e.g., whether the remote device has received an identity response from the requested source device). If the remote device has not identified a physically connected source device, the remote device determines whether its list of source devices is empty (block 132). If the remote device does not have an empty list, the remote device returns to block 128. On the other hand, if the remote device has an empty list, the remote device returns to block 118.

Returning to block 130, if the remote device has identified the source device that it is coupled to (e.g., received an identity response such as a change in an output from the source device), the remote device sends a locking signal to the source device (block 134). As illustrated, block 134 may also be reached by the remote device identifying the source device that it is coupled to per block 136. At block 138, the remote device determines whether a timeout has occurred (e.g., a time period has elapsed). If a timeout has occurred, the remote device returns to block 102. However, if a timeout has not occurred, the remote device determines whether the source device is ready to be associated with the remote device (e.g., whether the source device has provided an acknowledgment of the locking signal) (block 140). If the source device has not acknowledged receipt of the locking signal, the remote device returns to block 138. On the other hand, if the source device has acknowledged receipt of the locking signal, the remote device broadcasts a release signal to release other source devices (block 141) and is associated with the source device per block 108. Accordingly, the remote device may be associated (e.g., paired) with the source device to which it is physically connected.

Figure 5:
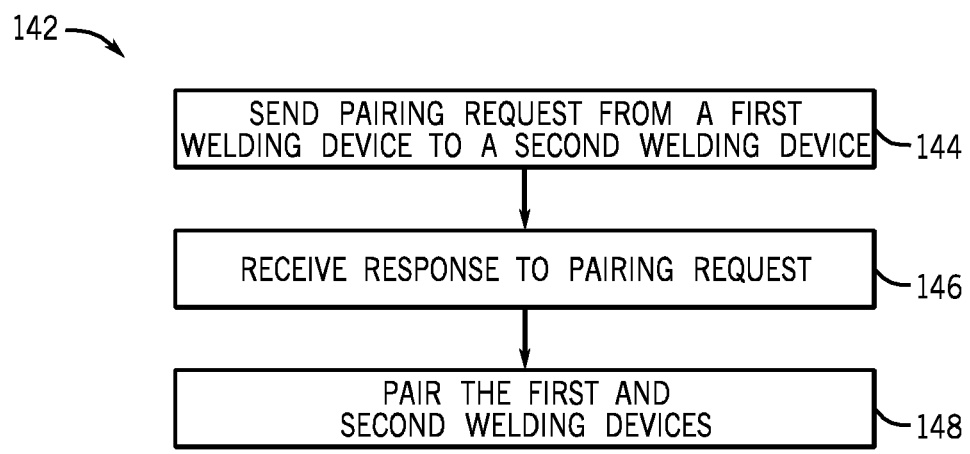
FIG. 5 is a flow chart of an embodiment of a method for pairing welding devices in accordance with aspects of the present disclosure.
Figure 6:
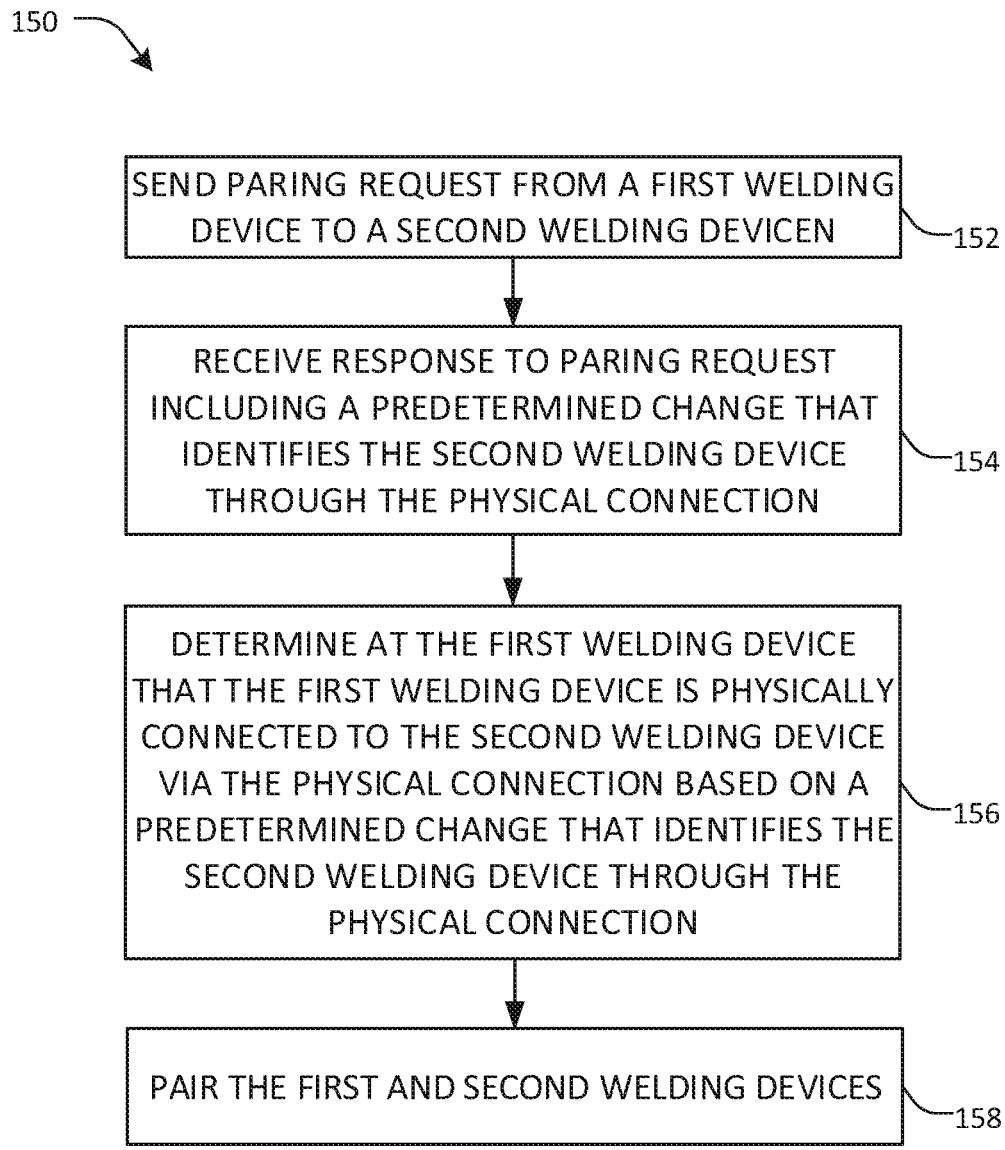
FIG. 6 is a flow chart of an embodiment of a method for pairing welding devices in accordance with aspects of the present disclosure.

FIG. 5 is a flow chart of an embodiment of a method 142 for pairing welding devices in accordance with aspects of the present disclosure. In the present embodiment, a pairing request (e.g., request for association) is sent from a first device (e.g., first welding device) to a second device (e.g., second welding device) (block 144). The pairing request may be sent automatically (e.g., without user intervention), such as when the first device is powered on or restarted. In certain embodiments, the pairing request may be sent from the first device to the second device via data carried by welding power (e.g., power line communication). In other embodiments, the pairing request may be sent using any suitable wired or wireless communication. Furthermore, in some embodiments the pairing request may include a unique identifier that may be used by the second device to identify the first device. The first device receives a response to the pairing request (block 146).

As previously described, the second device is physically connected to the first device and the response to the pairing request includes a change (e.g., a pulsed change) in something physically carried by the physical connection (e.g., welding power, welding consumables such as shielding gas flow and welding wire, air flow, gas flow, fluid flow, light transmissions, heat transmissions, sound). As will be appreciated, the physical connection may be a cable (e.g., fiber optic, electrical, welding), wire, electrical conductor, hose, tube, and so forth. After receiving the response to the pairing request from the second device, the first device and the second device are paired together (block 148). As may be appreciated, in some embodiments, the pairing request itself may be a change in something physically carried by the physical connection, while the response may be data carried by welding power and/or both the pairing request and the response may be a change in one or more things physically carried by the physical connection. In certain embodiments, before the first and second devices are paired together, the first device may send an acknowledgment to the second device that the response was received. Using such a method, the first and second devices may be paired together even if cross-talk exists in the environment where the first and second devices are located.

FIG. 5 is a flow chart of an embodiment of a method 150 for pairing welding devices in accordance with aspects of the present disclosure. In the present embodiment, a pairing request (e.g., request for association) is sent from a first device (e.g., first welding device) to a second device (e.g., second welding device) (block 152). The pairing request may be sent automatically (e.g., without user intervention), such as when the first device is powered on or restarted. A response to the pairing request is received, at the first welding device from the second welding device (block 154). For example, the second welding device is physically connected to the first welding device, and the response includes a predetermined change in provision of voltage or current of a welding power output, or welding consumables, or any combination thereof. In the example of method 150, the predetermined change corresponds to an identification signal that identifies the second welding device through the physical connection between the first welding device and the second welding device. In certain embodiments, the pairing request may be sent from the first device to the second device via data carried by welding power (e.g., power line communication). In other embodiments, the pairing request may be sent using any suitable wired or wireless communication. A determination is made at the first welding device that the first welding device is physically connected to the second welding device via the physical connection (block 156). In examples, the determination is based on the predetermined change in the voltage or current of the welding power output, or the welding consumables, or any combination thereof, that identifies the second welding device through the physical connection. Furthermore, in some embodiments, the first welding device and the second welding devices are paired (block 158) after the first welding device receives the response to the pairing request from the second welding device.

Although the embodiments described herein have focused on pairing a source device to a remote device, in certain embodiments a source device may be paired with multiple remote devices. Furthermore in some embodiments, a remote device may be paired with multiple source devices. Likewise, a pairing combination may be made between any source device and any remote device. As will be appreciated, in certain embodiments, a remote device may also be a source device. Moreover, in some embodiments, a source device may also be a remote device.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for pairing welding devices comprising:
   sending a pairing request from a first welding device to a second welding device;
   receiving, at the first welding device, a response to the pairing request from the second welding device, wherein the second welding device is physically connected to the first welding device, and wherein the response comprises a predetermined change in provision of voltage or current of a welding power output, or welding consumables, or any combination thereof, the predetermined change corresponding to an identification signal that identifies the second welding device through the physical connection between the first welding device and the second welding device;
   determining, at the first welding device, that the first welding device is physically connected to the second welding device via the physical connection based on the predetermined change in the voltage or current of the welding power output, or the welding consumables, or any combination thereof, that identifies the second welding device through the physical connection; and pairing the first welding device and the second welding device after the first welding device receives the response to the pairing request from the second welding device.

2. The method of claim 1, wherein sending the pairing request from the first welding device to the second welding device comprises sending the pairing request using data carried by the welding power output, the welding consumables, or any combination thereof.

3. The method of claim 1, wherein sending the pairing request from the first welding device to the second welding device comprises sending a unique identifier of the first welding device to the second welding device.

4. The method of claim 1, wherein the second welding device is physically connected to the first welding device via a cable.

5. The method of claim 2, wherein the pairing request comprises a pulsed change in the voltage or current of the welding power output, or a pulsed change in a flow of the welding consumables, or any combination thereof, wherein one or more of the pulsed changes correspond to the identification signal.

6. The method of claim 1, wherein pairing the first welding device and the second welding device comprises sending an acknowledgment from the first welding device to the second welding device to notify the second welding device that the response was received.

7. The method of claim 1, comprising powering the first welding device, wherein powering the first welding device results in the pairing request being sent from the first welding device to the second welding device.

8. A welding system comprising:
a first welding device; and
a second welding device configured to provide a welding power output, welding consumables, or any combination thereof, to the first welding device;
wherein the first welding device is configured to:
send a pairing request to the second welding device;
receive a response to the pairing request from the second welding device comprising a first predetermined change in provision of one of voltage or current of the welding power output to the first device, or a second predetermined change in a flow of the welding consumables, or any combination thereof, at least one of the first or second predetermined change corresponding to an identification signal that identifies the second welding device through the physical connection between the first welding device and the second welding device;
determine that the first welding device is physically connected to the second welding device via the physical connection based on the first predetermined change in the voltage or current of the welding power, or the second predetermined change in the flow of the welding consumables, or any combination thereof, that identifies the second welding device through the physical connection; and
pair with the second welding device after receiving the response to the pairing request.

9. The welding system of claim 8, comprising a cable coupling the first welding device to the second welding device.

10. The welding system of claim 9, wherein the cable is configured to carry the welding power output, the welding consumables, or any combination thereof, between the first welding device and the second welding device.

11. The welding system of claim 10, wherein the first welding device is configured to communicate with the second welding device using data carried by the welding power output, the welding consumables, or any combination thereof.

12. The welding system of claim 8, wherein the first welding device is configured to initiate restoring a previous pairing with the second welding device if the previous pairing existed within a predetermined duration.

13. The welding system of claim 8, wherein the first welding device is configured to send the pairing request to the second welding device as a result of being powered on.

14. A method for pairing welding devices comprising:
receiving a pairing request from a first welding device at a second welding device;
sending, from the second welding device, a response to the pairing request, wherein the second welding device is physically connected to the first welding device, and wherein the response comprises a pulsed change in one of voltage or current of a welding power output that is provided to the first device, the pulsed change corresponding to an identification signal that identifies the second welding device through the physical connection between the first welding device and the second welding device;
determining, at the first welding device, that the first welding device is physically connected to the second welding device via the physical connection based on the pulsed change in the voltage or current of the welding power that identifies the second welding device through the physical connection; and
pairing the first welding device and the second welding device after the second welding device sends the response to the pairing request.

15. The method of claim 14, comprising restoring a previous pairing between the first welding device and the second welding device if the previous pairing existed within a predetermined duration.

16. The method of claim 15, wherein the predetermined duration is based on a duration that begins after the first welding device is powered off.

17. The method of claim 14, wherein sending the response to the pairing request comprises sending a unique identifier of the second welding device.

18. The method of claim 14, wherein the pairing request or the response further comprises a pulsed change in provision of one or more welding consumables, or any combination of the welding power and the one or more welding consumables.

19. The method of claim 1, comprising restoring a previous pairing between the first welding device and the second welding device if the previous pairing existed within a predetermined duration that is based on a duration that begins after the first welding device is powered off.

20. The method of claim 1, further comprising:
requesting verification that the first device is physically coupled to the second device during pairing; and
changing a current or a voltage of the welding power output such that the first device can verify that the second device is physically connected to the first device.

* * * * *